United States Patent

[11] 3,573,822

| [72] | Inventor | Thomas W. J. Kennedy<br>Belleville, Ontario, Canada |
|---|---|---|
| [21] | Appl. No. | 859,062 |
| [22] | Filed | Sept. 18, 1969 |
| [45] | Patented | Apr. 6, 1971 |
| [73] | Assignee | Northern Electric Company Limited<br>Montreal, Quebec, Canada |

[54] RANGE GATED DOPPLER FILTER
5 Claims, 1 Drawing Fig.

[52] U.S. Cl........................................... 343/7.7,
307/235, 307/253, 343/9
[51] Int. Cl........................................... G01s 9/42,
H03k 5/20
[50] Field of Search.......................................... 343/5, 7.7,
9; 307/231, 235, 239, 240, 253

[56] References Cited
UNITED STATES PATENTS

| 2,776,425 | 1/1957 | Altman............................ | 343/9X |
| 3,054,910 | 9/1962 | Bothwell........................ | 307/235 |
| 3,170,125 | 2/1965 | Thompson....................... | 307/235X |
| 3,500,400 | 3/1970 | Woerrlein........................ | 343/9 |

*Primary Examiner*—Rodney D. Bennett, Jr.
*Assistant Examiner*—Malcolm F. Hubler
*Attorney*—Weir, Marshall, Mac Rae & Lamb ABSTRACT: A range-gated doppler filter having a balanced input switch with cancelling feedback supplied to the switch from a following low-pass filter section.

Patented April 6, 1971      3,573,822
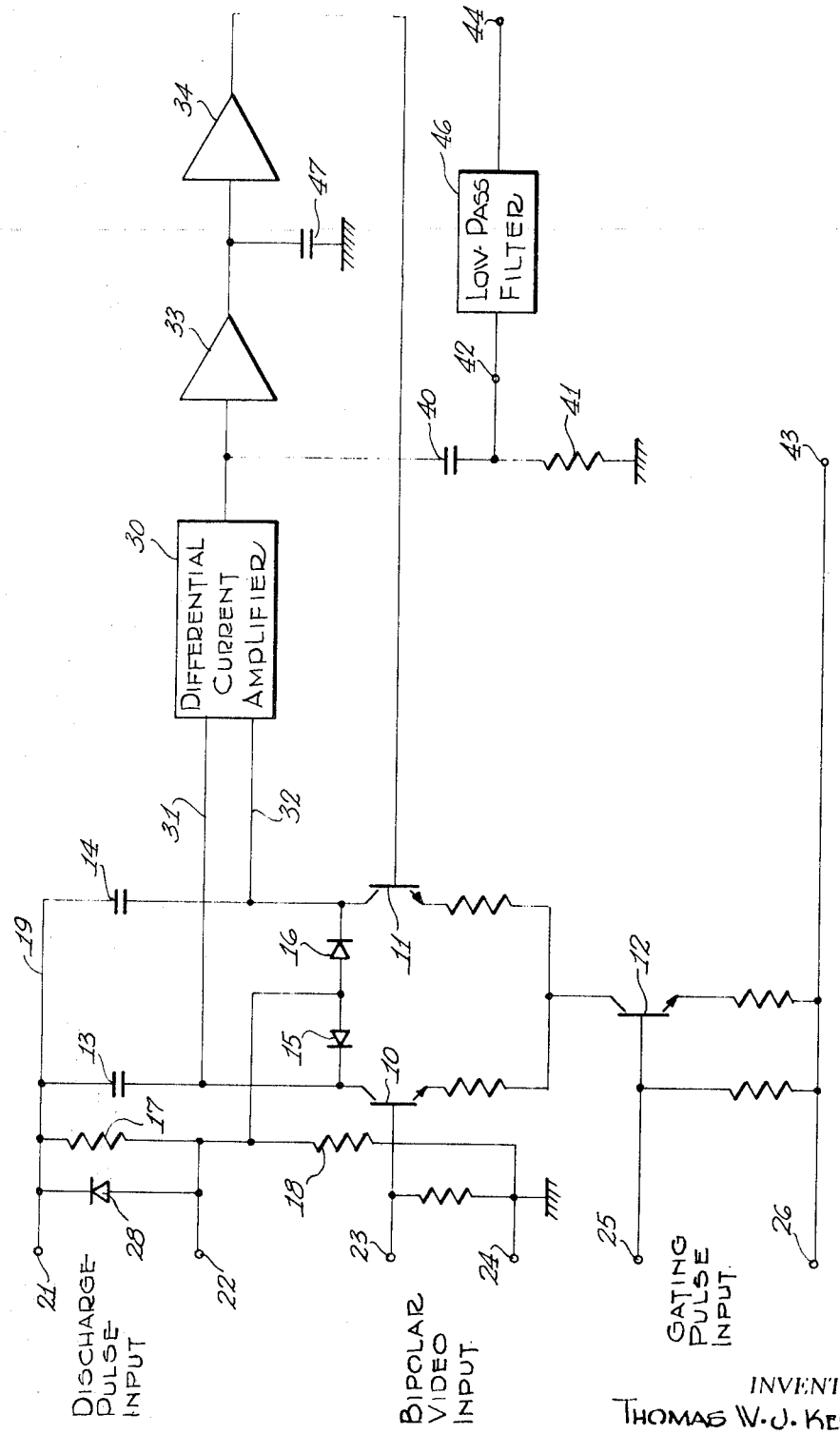
INVENTOR
THOMAS W. J. KENNEDY
BY Weir, Marshall,
Mac Rae & Lamb.
PATENT AGENT

RANGE GATED DOPPLER FILTER

BACKGROUND OF THE INVENTION

This invention relates generally to moving-target-indication (MTI) radar systems and more specifically to a range-gated Doppler filter for use in such systems.

One type of MTI radar system detects the frequency shift between the transmitted and received signal caused by a moving target. Such detection is performed by mixing the received signal with the output of an oscillator synchronized to the transmitted signal. The resulting output from the mixer, frequently referred to as the video signal, contains a DC component representative of fixed targets and low-frequency components representative of the Doppler shift caused by moving targets. To extract the significant information regarding moving targets, it is clear that some form of band-pass filtering is required.

Two further aspects of the signal processing must be considered. In order to achieve accuracy in the determination of the range of the moving target, range gates are provided which sequentially sample the video frequency output from the mixer. Each range gate opens in sequence just long enough to sample the voltage of the video waveform corresponding to a different range interval in space. An echo from a moving target produces a series of pulses varying in amplitude according to the Doppler frequency at the output of the corresponding range gate. Where the Doppler frequency is lower than the sampling frequency of the range gates, several cycles of the sampling frequency are necessary to extract the Doppler frequency. This process is aided by providing a pulse stretching or boxcar generator circuit at the output of each range gate. Such circuits aid in the filtering and detection process by emphasizing the fundamental component of the Doppler frequency and reducing harmonics of the sampling frequency. A fuller discussion of MTI radar systems is given in the book "Introduction to Radar Systems" by M. I. Skolnik, McGraw Hill, 1962, with particular reference to Chapter 4.

One type of range-gated Doppler filter uses a ring diode switch for each range gate operating in conjunction with a storage capacitor to form the necessary boxcar generator. The capacitor is buffered from the following band-pass filter by a high-input impedance circuit. A gating circuit controls the ring diode switch so that the capacitor is charged to the voltage of the video signal at the moment of sampling. This charge is retained and then "dumped" via a discharge gate just before the next sampling pulse. This type of filter has the disadvantage that capacitor charge leakage during the storage period gives an output at the sampling frequency reducing the detectability of small signals. Similar adverse effects exist due to switching breakthrough caused by diode unbalance in the ring switch and unbalance in the discharge gate.

SUMMARY OF THE INVENTION

The range-gated Doppler filter of this invention comprises a balanced input switch formed by first and second transistors having a common emitter load. The base of the first transistor is adapted to be connected to a source of Doppler radar video signals. First and second capacitors are connected to the collectors of the respective transistors and receive equal and opposite increments of charge in response to the video signal at the instance of sampling. Gating means are provided to enable the balanced switch at spaced intervals for sampling the video signal. A differential amplifier is connected to the capacitors to produce a signal proportional to the difference in capacitor voltages and this signal is applied to a low-pass filter. The output of the low-pass filter is fedback to the base of the second transistor to cancel low-frequency components at the switch input. The output from the Doppler filter is taken from that portion of the low-pass filter section connected to the output of the differential amplifier. In effect, the feedback loop gives the filter a high pass characteristic. In use, a further low-pass filter is connected to the output to remove switching components at the sampling frequency, giving an overall band-pass characteristic. This described circuit arrangement provides advantages in that any switching breakthrough or capacitor leakage is cancelled differentially. Accordingly, weak Doppler signals may be detected in the presence of strong clutter echoes.

BRIEF DESCRIPTION OF THE DRAWING

The single FIG. of the drawing is a schematic circuit diagram of the range-gated Doppler filter of the present invention.

DESCRIPTION OF THE PREFERRED EMBODIMENT

The range-gated Doppler filter shown in the single FIGURE of the drawing is provided with terminals 23 and 24 for connection to a source of bipolar video signals such as the coherent second detector of an MTI radar system. A balanced input switch is formed by two transistors 10 and 11 connected to a common emitter load for operation in differential amplifier fashion. Input terminal 23 is connected to the base of transistor 10. Desirably, the common emitter load is provided by a further transistor 12 acting as an approximation to a constant current source. Transistor 12 serves the further function of gating the balanced switch into conduction at the required instant for sampling the video waveform. For this purpose, terminals 25 and 26 are provided for connection to a suitable source of gating pulses. Terminal 26 is connected to a negative supply line providing the appropriate bias voltage for the balanced switch. Typically terminal 21 will be maintained about ground potential and terminal 26 at about −15 volts.

Capacitors 13 and 14 are provided in the collector circuits of transistors 10 and 11, respectively, to form a pulse stretching or boxcar generator circuit. A suitable discharge path for capacitors 13 and 14 is provided by diodes 15 and 16 connected to a biasing network formed by resistors 17 and 18. Resistors 17 and 18 extend between a positive voltage supply line 19 and ground. Terminals 21 and 22 are provided for connection to a source of suitable discharge pulses appropriately synchronized with the gating pulses supplied across terminals 25 and 26. Capacitors 13 and 14 are discharged by biasing diode 28, or an equivalent device, into forward conduction. The timing of the discharge pulse is such that it occurs approximately one pulse period of the radar system before the gating pulse applied to terminals 25 and 26.

A differential current amplifier 30 having a high input impedance has its two inputs connected to capacitors 13 and 14 by conductors 31 and 32, respectively. The differential amplifier thus senses the difference in the voltages appearing across the two capacitors and supplies an output current proportional to this difference to a current amplifier 33 which is in turn connected to an isolating amplifier 34. The output of amplifier 34 provides a feedback signal connected to the base of transistor 11. The open loop response of elements 30, 33 and 34 is that of a low-pass filter having a frequency response controlled by two shaping networks. The first shaping network consists of the series connection of capacitor 40 and resistor 41 connected between the output of differential amplifier 30 and ground. The second shaping network consists of capacitor 47 connected between the output of amplifier 33 and ground. The effect of the feedback via the low-pass filter is to cancel low-frequency components at the switch input and thus remove undesirable clutter in the radar signal before the boxcar generator. Essentially, then, the feedback loop and balanced switch act as a high pass filter. The output from the filter is obtained across terminals 42 and 43 with terminal 42 being connected to the junction of capacitor 40 and resistor 41. Although not concerned with the invention of the present application, in a fully operational system an additional low-pass filter 46 would be inserted after terminal 42 having a knee frequency at approximately half the sampling frequency to eliminate the high-frequency switching components. Thus, the overall response of the feedback loop and low-pass filter 46 is that of a band-pass filter.

One disadvantage of a single channel filter is that blind speeds occur corresponding to Doppler frequencies in the region of one-half the sampling frequency. This defect may be overcome by using two range-gated Doppler filters instead of the single filter described above. One of the filters is connected to an inphase coherent detector and the other to a quadrature coherent detector. The output from one of the filters is passed through a broadband $\pi/2$ phase shifter and then combined with the output from the other. In this manner an output signal is obtained even at blind speeds.

I claim:

1. A range-gated filter for radar signal processing comprising first and second transistors having a common emitter load:
   means for supplying a coherently detected signal to the base of said first transistor;
   gating means for controlling the conduction of said first and second transistors,
   first and second capacitors connected to the collectors of said first and second transistors to receive opposite increments of charge in response to the value of the coherently detected signal when said gating means enables said first and second transistors;
   amplifying means producing a signal proportional to the difference between the voltages appearing on said capacitors;
   a low-pass filter connected to said amplifying means to modify said last-mentioned signal;
   a feedback connection from the output of said low-pass filter to the base of said second transistor; and
   output terminal means connected to said low-pass filter.

2. A filter as set out in claim 1 wherein the common emitter load of said first and second transistors is a third transistor acting as a constant current load.

3. A filter as set out in claim 2 wherein said gating means include said third transistor.

4. A filter as set out in claim 1 further comprising means for discharging said capacitors prior to actuation of said gating means.

5. A filter as set out in claim 1 including a further low-pass filter connected to said output terminal means.